(12) United States Patent
Schmidl et al.

(10) Patent No.: US 9,681,505 B2
(45) Date of Patent: Jun. 13, 2017

(54) CIRCUIT ARRANGEMENT AND METHOD FOR OPERATING AND DIMMING AT LEAST ONE LED

(71) Applicant: OSRAM GmbH, Munich (DE)

(72) Inventors: Maximilian Schmidl, Pullach (DE); Joachim Muehlschlegel, Groebenzell (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/280,699

(22) Filed: May 19, 2014

(65) Prior Publication Data
US 2014/0361704 A1    Dec. 11, 2014

(30) Foreign Application Priority Data
Jun. 6, 2013   (DE) .................. 10 2013 210 581

(51) Int. Cl.
H05B 33/08    (2006.01)

(52) U.S. Cl.
CPC ........ H05B 33/0815 (2013.01); *Y02B 20/346* (2013.01)

(58) Field of Classification Search
CPC .................................................. H05B 37/02
USPC ... 315/287, 294, 200 R, 308, 339, 362, 291, 315/246
See application file for complete search history.

(56) References Cited

U.S. PATENT DOCUMENTS

| | | | | |
|---|---|---|---|---|
| 6,225,759 B1* | 5/2001 | Bogdan | ............... | H02J 13/0048 315/291 |
| 6,445,143 B1* | 9/2002 | Min | ................ | G09G 3/3406 315/307 |
| 2004/0169477 A1* | 9/2004 | Yanai | .................. | H05B 39/044 315/98 |
| 2006/0033484 A1* | 2/2006 | Kung | ................ | H05B 33/0818 323/334 |

(Continued)

FOREIGN PATENT DOCUMENTS

WO    2013067564 A1    5/2013

OTHER PUBLICATIONS

Office action issued in the corresponding German application No. 102013210581.9 on Oct. 17, 2013; 5 pages.

(Continued)

*Primary Examiner* — Douglas W Owens
*Assistant Examiner* — Wei Chan
(74) *Attorney, Agent, or Firm* — Viering, Jentschura & Partner mbB

(57) ABSTRACT

A circuit arrangement includes a converter having a converter switch and a driver for the converter switch. The driver includes an interface coupling to a dimming apparatus supplying a dimming value. The driver provides an RF signal with a duty ratio at the output of the driver. The driver modifies the RF signal by superposition of a PWM signal such that, in correlation with the supplied dimming value, a predefinable number of periods of the RF signal is chopped from the RF signal. The driver is configured to reduce the duty ratio of the RF signal during at least one predefinable period of the RF signal in order to adjust levels of dimming which correspond to dimming values which are between a first and a second dimming value which differ from one another by at least one period of the RF signal.

13 Claims, 3 Drawing Sheets

(56) References Cited

U.S. PATENT DOCUMENTS

| | | | |
|---|---|---|---|
| 2007/0182338 A1* | 8/2007 | Shteynberg | H05B 33/0815 315/200 R |
| 2008/0130336 A1* | 6/2008 | Taguchi | H02M 1/4225 363/125 |
| 2008/0175029 A1* | 7/2008 | Jung | H02M 3/156 363/79 |
| 2008/0224629 A1* | 9/2008 | Melanson | H05B 33/0815 315/247 |
| 2009/0079357 A1* | 3/2009 | Shteynberg | H05B 33/0818 315/291 |
| 2011/0181196 A1* | 7/2011 | Kang | H05B 33/0851 315/246 |
| 2012/0019160 A1* | 1/2012 | Lee | H05B 33/0851 315/291 |
| 2013/0069561 A1* | 3/2013 | Melanson | H05B 33/0815 315/297 |
| 2013/0154504 A1* | 6/2013 | Hick | H05B 37/0245 315/287 |
| 2014/0375216 A1* | 12/2014 | Seidmann | H05B 33/0845 315/149 |

OTHER PUBLICATIONS

Austrian Search Report based on Application No. A50362/2014(3 Pages) dated Jul. 15, 2016 (Reference Purpose Only).

* cited by examiner

CIRCUIT ARRANGEMENT AND METHOD FOR OPERATING AND DIMMING AT LEAST ONE LED

CROSS-REFERENCE TO RELATED APPLICATION

This application claims priority to German Patent Application Serial No. 10 2013 210 581.9, which was filed Jun. 6, 2013, and is incorporated herein by reference in its entirety.

TECHNICAL FIELD

Various embodiments relate generally to a circuit arrangement and to a method for operating and dimming at least one LED.

BACKGROUND

Various embodiments relate to the operating and dimming of light sources which include a multiplicity of LEDs; however, it can also be used for operating and dimming individual LEDs. In the case of light sources which include a plurality of LEDs, the light color and/or the brightness of the individual LEDs can be very different during the dimming, owing to variation in the parameters of the individual LEDs (manufacturing variation), in particular owing to the variation in the individual non-linear characteristic curves of the LEDs. In the case of currents which are a fraction of the nominal current, the behavior of most LEDs is therefore not precisely specified.

The switching converters which are generally used to drive LEDs, for instance those disclosed in the document US 2006/0033484A1, are therefore driven using a radio-frequency PWM signal, wherein the duty ratio of said RF signal is reduced for dimming.

In document US 2008/0224629A1, the radio-frequency PWM signal of a switching converter in the OFF state of a connected phase-control or phase-gating dimmer is operated in a mode which damps oscillations between switching converter and dimmer.

In document US 2012/0019160A1, the amplitude of a low-frequency PWM current is adjusted by means of a series regulator on the basis of the duty cycle of the corresponding low-frequency PWM signal.

In the case of all of the abovementioned conventional dimming methods, the current supplied to the LEDs during the ON times must not fall below a predefinable minimum, since otherwise the abovementioned negative effects would arise. Usually, said minimum is assumed to be at approximately 30% of the nominal current. In order to achieve dimming values which are below said predefinable dimming threshold value, the conventional RF signal, which signal corresponds to a current through the LEDs of approximately 30% of the nominal current, is gated, that is to say a low-frequency PWM signal is superposed thereon, with the result that the RF signal is only forwarded to the output of the drive apparatus during certain times and not the rest of the time (so-called PWM dimming).

Even if it were possible for the low-frequency PWM dimming to be performed already on the basis of the nominal current, this is not done in practice owing to the noise (inductor) which occurs as a result.

In this connection, FIG. 1 shows the temporal profile of the drive signal AS for two different dimming values, said signal being provided at the converter switch by the drive device. A low-frequency PWM signal is superposed on said RF signal, which has a period T1 and an ON time $t_{on1}$ and an OFF time $t_{off1}$, said low-frequency PWM signal virtually gating the RF signal. In the schematic illustration from FIG. 1, the PWM signal has the ON time $t_{on2}$ and the OFF time $t_{off2}$ and a period T2 before the dimming step. After the dimming step, the period is unchanged, that is to say T3=T2, but the ON time $t_{on3}$ has reduced compared with $t_{on2}$ by a period T1 of the RF signal; $t_{off3}$ has increased correspondingly compared with $t_{off2}$. FIG. 1 also shows the respective output currents $I_{out3}$ and $I_{out2}$ of the converter which occur in both cases.

The RF signal is, for example, between 60 kHz and 150 kHz, while the PWM signal can be, for example, between 100 Hz and 1000 Hz. Owing to this frequency ratio, it is obvious that only discrete dimming steps can be adjusted, that is to say only a whole period T1 of the RF signal can be chopped from one dimming value to the next-lowest dimming value. Owing to tolerances, whether they be caused by fluctuations in temperature or the supply voltage, it is not possible in practice to set $t_{on3}$ such that it becomes located at a desired point within $t_{on1}$, in order to obtain a finer dimming resolution as a result. By means of the illustrated process, it is always whole periods of the RF signal that are chopped when changing the dimming setting.

As long as the dimming setting does not yet represent very low dimming values, this has a barely visible effect. If, for example, 500 periods T1 are contained in $t_{on2}$, then a much smaller dimming step can be achieved by chopping one period of the RF signal, that is to say that $t_{on3}$ has 499 periods of the RF signal. In the case of low dimming values, however, the chopping of one period of the RF signal leads to large jumps in terms of percentage in the light emitted by the LEDs. If, for example, only 10 RF periods T1 are present and one is chopped, this corresponds to a jump of 10%.

Said jumps are visible in the output current and can have a disturbing effect. A finer resolution is not possible in the case of low dimming values. Moreover, the frequency of the RF signal can change (regulated system) owing to temperature or voltage changes in the system. The PWM signal for dimming does not fit in owing to a separate generation thereof. If a period of the RF signal continually disappears and reappears owing to said oscillations (limit oscillation), an undesirable flickering can result.

SUMMARY

A circuit arrangement includes a converter having a converter switch and a driver for the converter switch. The driver includes an interface coupling to a dimming apparatus supplying a dimming value. The driver provides an RF signal with a duty ratio at the output of the driver. The driver modifies the RF signal by superposition of a PWM signal such that, in correlation with the supplied dimming value, a predefinable number of periods of the RF signal is chopped from the RF signal. The driver is configured to reduce the duty ratio of the RF signal during at least one predefinable period of the RF signal in order to adjust levels of dimming which correspond to dimming values which are between a first and a second dimming value which differ from one another by at least one period of the RF signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
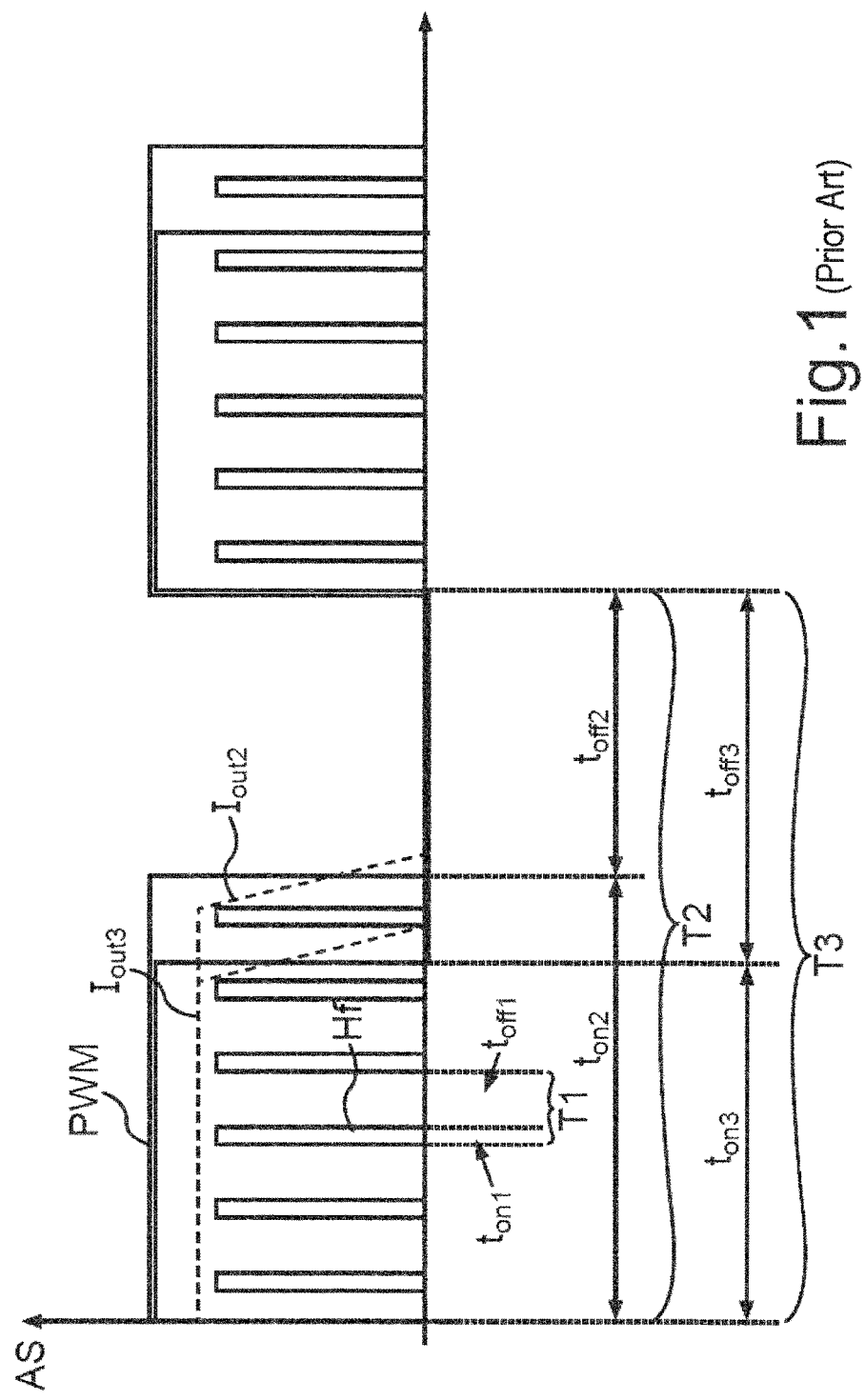
FIG. 1 shows the temporal profile of the drive signal AS for the converter switch for two different dimming values which differ from one another by one period of the RF signal, in the case of so-called PWM dimming.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments relate generally to a circuit arrangement for operating and dimming at least one LED, including an input having a first and a second input connection for coupling to a DC supply voltage, a converter having at least one converter switch, wherein the converter is coupled to the input on the input side, a drive apparatus for the at least one converter switch, wherein the drive apparatus comprises an interface for coupling to a dimming apparatus for supplying a dimming value, wherein the dimming value is correlated with the level of dimming, wherein the drive apparatus is also configured to provide an RF signal with a predefinable duty ratio at the output of said drive apparatus, and an output having a first and a second output connection for coupling to the at least one LED, wherein the output is coupled to the output of the converter, wherein the drive apparatus is configured to modify, at least from a first predefinable dimming threshold value in the case of an increasing level of dimming, the RF signal by superposition of a PWM signal such that, in correlation with the supplied dimming value, a predefinable number of periods of the RF signal is chopped from the RF signal. In addition, various embodiments relate to a corresponding method for operating and dimming at least one LED.

Various embodiments develop a circuit arrangement of the type mentioned at the outset or a method of the type mentioned at the outset such that an improved dimming behavior is made possible, even at low dimming settings.

Various embodiments are based on the discovery that the abovementioned problem can be solved in an optimum manner by the known PWM (pulse width modulation) dimming being neatly linked to an adapted form of the analog dimming. Accordingly, the drive apparatus is configured to reduce the duty ratio of the RF (radio frequency) signal during at least one predefinable period of the RF signal in order to adjust levels of dimming which correspond to dimming values which are between a first and a second dimming value which differ from one another by at least one period of the RF signal.

Thus, in the case of an increasing level of dimming, a period of the RF signal is not abruptly chopped, rather the duty ratio of the RF signal in at least one period of the RF signal, e.g. in a predefinable number of periods of the RF signal, is "faded". A lower current is output from the converter to the at least one LED (light emitting diode) during said at least one period of the RF signal than during the remaining ON time of the PWM signal. As a result, a high resolution can be achieved, even at low dimming settings, in the case of which high resolution jumps in the output current supplied to the at least one LED can be reliably avoided.

Owing to the fact that a current is provided to the LEDs for the predominant part of the ON time of the PWM signal, which current ensures that there are no fluctuations in the light color and/or the brightness of the individual LEDs, the advantages of the PWM dimming—see above—can be adopted in the method according to various embodiments or in the circuit arrangement according to various embodiments.

Hence, it can be stated in summary that, owing to the reduction in the duty ratio of the RF signal during at least one, e.g. multiple, predefinable periods of the RF signal, the dimming does not lead to fluctuations in brightness since the number of said predefinable periods is relatively short compared to the remaining ON time of the PWM signal, whereas disadvantages such as flickering owing to fluctuations in the system (temperature/voltage, etc.) or visible jumps in the light output by the at least one LED in the event of a change in the dimming value can be reliably avoided.

In various embodiments, the drive apparatus may be configured likewise to modify, e.g. to reduce or to increase, the frequency of the RF signal in the case of a reduction in the duty ratio during the at least one predefinable period of the RF signal, wherein the integral of the ON times over the at least one predefinable period of the RF signal is smaller than the integral of the ON times over the at least one predefinable period of the RF signal prior to the modification. By means of an increase in the frequency, the ripple in the output current supplied to the at least one LED can be reduced. As a result, a reduction in the electromagnetic distortion can also be achieved. By contrast, a reduction in the frequency of the RF signal offers the advantage that the pulse widths of the RF signal are larger than with increased or unchanged frequency, as a result of which the at least one converter switch does not transition as quickly into the purely linear operation.

Alternatively, the drive apparatus may be configured not to change the frequency of the RF signal during at least one period of the RF signal in the case of a reduction in the duty ratio during the at least one period. In this way, the current supplied to the at least one LED changes in proportion to the pulse width and can therefore be predicted particularly easily.

To avoid noise, e.g. owing to an inductor of the converter, the drive apparatus can be configured to gradually reduce the duty ratio of the RF signal in the case of an increasing level of dimming in order to adjust levels of dimming between a dimming value which corresponds to no dimming and the first predefinable dimming threshold value. (To clarify: this relates to the situation before a reduction in the duty ratio during selected periods of the RF signal to realize a particularly fine resolution of the dimming at low dimming values has taken place.) As has been mentioned, this is e.g. done up to at most a duty ratio which corresponds to an output current supplied to the at least one LED of approximately 30% of the nominal current. If it was desired to reduce the duty ratio further, fluctuations in the light color and/or the brightness would arise.

As has already been mentioned, according to various embodiments, the duty ratio of the RF signal is reduced during predefinable periods of the RF signal, wherein the predefinable periods of the RF signal advantageously correspond to between 0.2% and 10%, e.g. 1%, of a period of the PWM signal. Since accordingly the reduction in the duty ratio only takes place during a small proportion of a period of the PWM signal, fluctuations in the brightness and/or the color in the light output from the at least one LED can be reliably avoided as a result.

The at least one predefinable period of the RF signal during which the duty ratio is reduced is e.g. located at the end of the ON time of the PWM signal. However, in principle, it can be located at any point or points within the ON time of the PWM signal.

The frequency of the RF signal is preferably between 60 and 150 kHz, while the frequency of the PWM signal is e.g. between 100 Hz and 20 kHz, e.g. 400 Hz.

The embodiments presented with regard to the circuit arrangement and their advantages correspondingly hold true, if applicable, to the method according to various embodiments.

Figure 2:
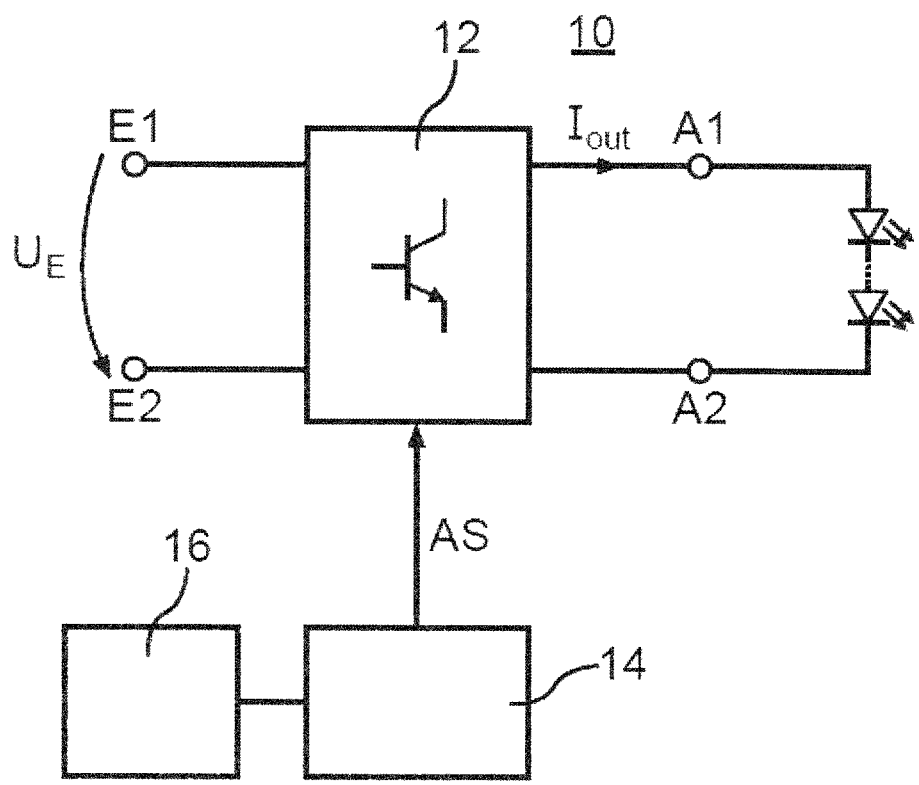
FIG. 2 shows a schematic illustration of a block circuit diagram of a circuit arrangement according to various embodiments.

FIG. 2 shows a schematic illustration of an embodiment of a circuit arrangement 10. Said circuit arrangement includes an input having a first and a second input connection E1, E2, between which a DC supply voltage UE can be applied. Said DC supply voltage can be obtained from an AC mains voltage, for example, by using a rectifier. The input E1, E2 is coupled to the input of a converter 12 which includes at least one schematically illustrated converter switch.

The output of the converter 12 constitutes the output of the circuit arrangement 10 and includes a first and a second output connection A1, A2. The series circuit composed of a multiplicity of LEDs is coupled between said output connections A1, A2. It goes without saying that a multiplicity of such series circuits can also be connected in parallel. The converter 12 comprises at least one converter switch—already mentioned—the control electrode of which is coupled to a drive apparatus 14 which supplies at its output a signal AS to the control electrode of the at least one converter switch. The drive apparatus 14 is coupled to a dimming apparatus 16 for supplying a dimming value, wherein the dimming value is correlated with the level of dimming. The converter 12 provides at its output an RF current $I_{out}$ having a predefinable duty ratio. The drive apparatus 14 is configured to modify, at least at a first predefinable dimming threshold value in the case of an increasing level of dimming, the RF signal by superposition of a PWM signal such that, in correlation with the supplied dimming value, a predefinable number of periods of the RF signal is chopped from the RF signal.

As will be illustrated in more detail with reference to FIG. 3, the drive apparatus 14 is configured to reduce the duty ratio of the RF signal during at least one period of the RF signal, e.g. during a plurality of predefinable periods of the RF signal, in order to adjust levels of dimming which correspond to dimming values which are between a first and a second dimming value which differ from one another by at least one period of the RF signal.

Figure 3:
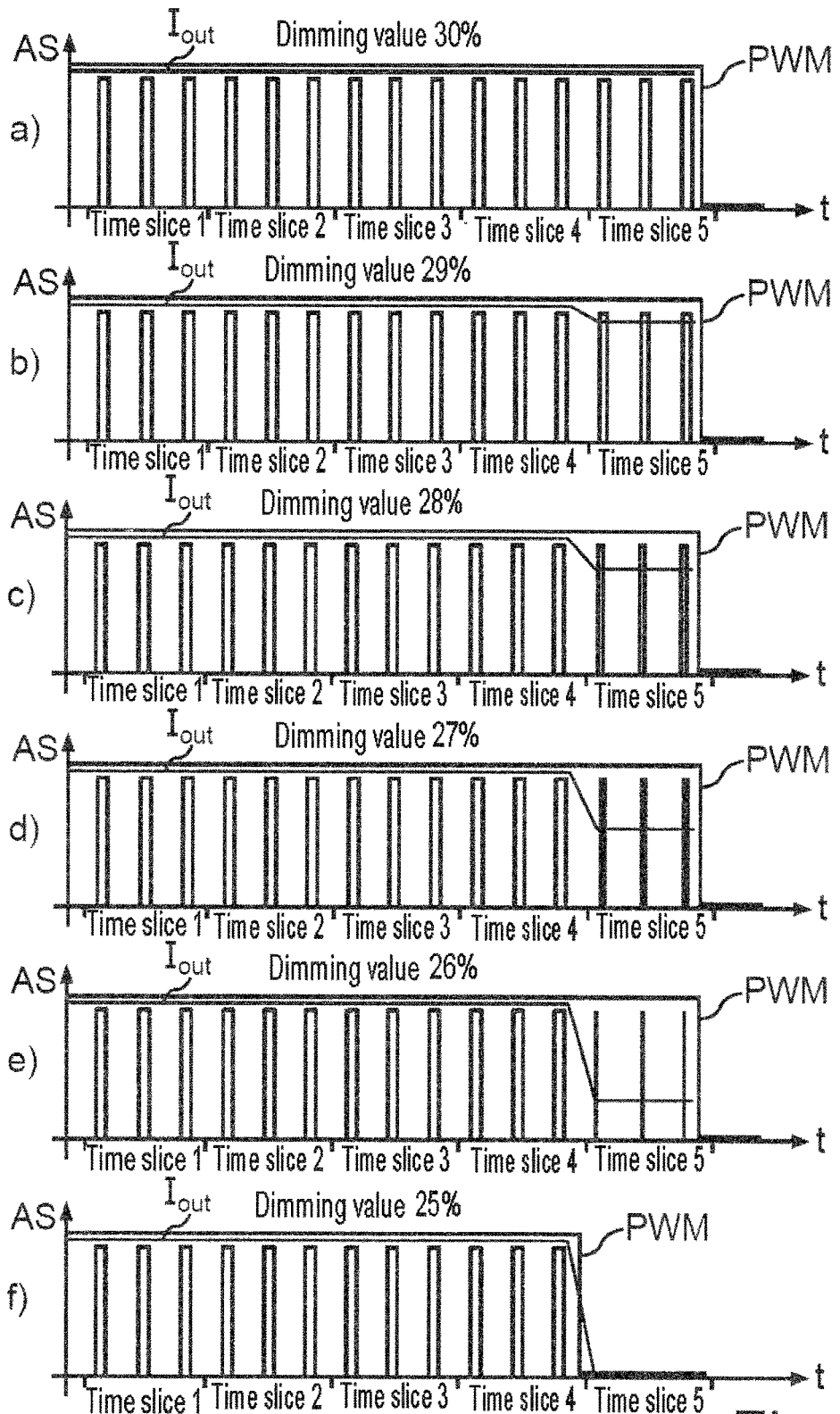
FIG. 3 shows the temporal profile of the drive signal AS supplied to the converter switch for adjusting various dimming values according to the method according to various embodiments.

In the embodiment illustrated in FIG. 3, in each case three periods of the RF signal are combined to form a so-called "time slice". As is obvious to a person skilled in the art, a time slice may also include only one period of the RF signal or a plurality of periods of the RF signal.

FIG. 3a) shows the temporal profile of the drive signal AS and the output current $I_{out}$ at a dimming value of 30%. The smallest time unit by which the PWM signal can be shortened or lengthened corresponds to a time slice. As can be seen in FIG. 3a), the duty ratio is approximately 30% and is identical in all of the illustrated time slices 1 to 5 during the ON time of the PWM signal.

If it were desired to dim further according to the prior art, the ON time of the PWM signal would be shortened by one unit, that is to say one time slice, as is illustrated in FIG. 3f). However, this would already result in a dimming value of 25% in this case. The transition of the light emitted by the at least one LED in the case of being driven with a current $I_{out}$ according to FIG. 3a) to being driven according to figure FIG. 3f) would be registered by a user as a noticeable jump in the brightness and/or the color of the light output by the at least one LED.

By contrast, according to various embodiments—see FIG. 3b)—the duty ratio of the RF signal is reduced, for example by a further 20%, in one time slice, in the present case in the time slice 5 at the end of the ON time of the PWM signal. The resulting duty ratio is therefore 30%−6%=24%. The frequency of the PWM signal in the illustration of FIG. 3 is 400 Hz, while the frequency of the RF signal is between 60 and 150 kHz. Since the latter signal is generated from a 48 Mhz clock, a reduction in the duty ratio of the RF signal of 20%—as illustrated in FIG. 3b)—is possible without any problems at all. As can be gathered from the profile of the current $I_{out}$, this falls slightly during the time slice 5, as a result of which the desired level of dimming is achieved.

The illustration of FIG. 3c) differs from the illustration of FIG. 3b) in that, in the time slice 5, the duty ratio of the RF signal has been reduced by a further 20% and is now 18%. As can be seen from the profile of the current $I_{out}$, said current falls further during the time slice 5. The dimming value in the case of the illustration of FIG. 3c) is approximately 28%.

To adjust a dimming value of 27%, according to FIG. 3d), the duty ratio of the RF signal during the time slice 5 is reduced by a further 20%. The output current $I_{out}$ falls further. The duty ratio of the RF signal during the time slice 5 is 12%.

Finally, to adjust a dimming value of 26%—see FIG. 3e)—the duty ratio of the RF signal during the time slice 5 is reduced to 6%, as a result of which the output current $I_{out}$ falls even further during the time slice 5. As has already been mentioned, to adjust a dimming value of 25%, the ON time of the PWM signal is shortened by the duration of one time slice—see FIG. 3f).

In the embodiment illustrated in FIG. 3, the frequency of the RF signal in the time slice in which the duty ratio has been further reduced, time slice 5 in the present case, has been maintained unchanged. However, as will be explained in more detail further below, said frequency can be both increased and decreased, for example with respect to the converter used, as long as the integral of the ON times over the periods of the RF signal of the respective time slice is smaller than the integral of the corresponding ON times prior to the modification. Even a mere shortening of the RF switch-on time, which normally involves an increase in the RF frequency, leads to the desired result.

An increase in the frequency of the RF signal during the predefinable periods comes into question, for example, in the case of a buck converter in transition mode with active retrigger.

Any type of driver which is able to perform PWM dimming comes into consideration as converter. Thus, depending on the topology, various procedures may occur in the analog dimming time slice—that is the time slice 5 in the example from FIG. 3: in the case of a step-down end stage, either the duty ratio is reduced—as shown—proportional to the desired dimming setting (fine resolution) at a frequency which remains the same, or the switch-on time is correspondingly reduced and a change in frequency is permitted, for example in order to avoid a ripple which is too large in the output current $I_{out}$. If a half-bridge having a transformer is used as converter, for example LLC, the frequency of the RF signal is changed while maintaining the duty cycle or the duty cycle is changed while maintaining the frequency. A simultaneous change in the frequency of the RF signal and the duty cycle while maintaining the abovementioned boundary condition (integral) is also possible. This correspondingly applies to a so-called flyback converter.

According to various embodiments, dimming is therefore no longer performed by simple gating but rather by "fading out" the RF signal at the end of the low-frequency PWM signal. FIG. 3 shows by way of example the temporal profile of the drive signal AS which would be suitable for a step-down converter as converter.

Although a reduction in steps of 20% has been performed in FIG. 3 for the purposes of better clarification, it goes without saying that significantly smaller changes in terms of percentage also come into question taking into account the resolution of the RF signal.

If the time slices in which the duty ratio is reduced further are small enough, there is no risk of overloading the converter. In the worst case, the switching transistor would admittedly be in linear operation for a few clock cycles, it also being possible for this to be prevented by limiting the RF switch-on time downwards or reducing the frequency of the RF signal during the time slice.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for operating and dimming at least one light emitting diode, the circuit arrangement comprising:
    an input having a first and a second input connection for coupling to a DC supply voltage;
    a converter having at least one converter switch, wherein the converter is coupled to the input on the input side;
    a drive apparatus configured to output a signal to a control electrode of the at least one converter switch, wherein the drive apparatus comprises an interface for coupling to a dimming apparatus for supplying a dimming value, wherein the dimming value is correlated with a level of dimming, wherein the drive apparatus is also configured to provide an RF signal with a predefinable duty ratio at the output of said drive apparatus; and
    an output having a first and a second output connection for coupling to the at least one light emitting diode, wherein the output is coupled to the output of the converter;
    wherein the drive apparatus is configured to modify, at least from a first predefinable dimming threshold value in the case of an increasing level of dimming, the RF signal by superposition of a PWM signal such that, in correlation with the supplied dimming value, a predefinable number of periods of the RF signal is chopped from the RF signal;
    wherein the drive apparatus is configured to reduce the duty ratio of the RF signal during at least one predefinable period of the RF signal in order to adjust levels of dimming which correspond to dimming values which are between a first and a second dimming value which differ from one another by at least one period of the RF signal; wherein the PWM signal remains unchanged between the first dimming value and the second dimming value.

2. The circuit arrangement of claim 1, wherein the drive apparatus is configured likewise to modify the frequency of the RF signal in the case of a reduction in the duty ratio, wherein the integral of the ON times over the at least one predefinable period of the RF signal is smaller than the integral of the ON times over the at least one predefinable period of the RF signal prior to the modification.

3. The circuit arrangement of claim 1, wherein the drive apparatus is configured likewise to reduce or to increase the frequency of the RF signal in the case of a reduction in the duty ratio, wherein the integral of the ON times over the at least one predefinable period of the RF signal is smaller than the integral of the ON times over the at least one predefinable period of the RF signal prior to the modification.

4. The circuit arrangement of claim 1, wherein the drive apparatus is configured not to change the frequency of the RF signal in the case of a reduction in the duty ratio.

5. The circuit arrangement of claim 1, wherein the drive apparatus is configured to gradually reduce the duty ratio of the RF signal in the case of an increasing level of dimming in order to adjust levels of dimming between a dimming value which corresponds to no dimming and the first predefinable dimming threshold value.

6. The circuit arrangement of claim 1, wherein the drive apparatus is configured to reduce the duty ratio of the RF signal during predefinable periods of the RF signal, wherein the predefinable periods of the RF signal correspond to between 0.2% and 10% of a period of the PWM signal.

7. The circuit arrangement of claim 6, wherein the predefinable periods of the RF signal correspond to 1%, of a period of the PWM signal.

8. The circuit arrangement of claim 1, wherein the at least one predefinable period of the RF signal is arranged at the end of the ON time of the PWM signal.

9. The circuit arrangement of claim 1, wherein the frequency of the RF signal is between 60 and 150 kHz.

10. The circuit arrangement of claim 1, wherein the frequency of the PWM signal is between 100 Hz and 20 kHz.

11. The circuit arrangement of claim 10,
wherein the frequency of the PWM signal is 400 Hz.

12. A circuit arrangement for operating at least one light emitting diode, the circuit arrangement comprising:
   a converter having a converter switch, wherein the converter is configured to receive a DC supply voltage;
   a drive apparatus configured to output a signal to a control electrode of the converter switch, wherein the drive apparatus comprises an interface coupling to a dimming apparatus for supplying a dimming value, wherein the dimming value is correlated with a level of dimming, wherein the drive apparatus is also configured to provide an RF signal with a predefinable duty ratio at the output of said drive apparatus; and
   wherein the drive apparatus is configured to modify the RF signal by superposition of a PWM signal such that, in correlation with the supplied dimming value, a predefinable number of periods of the RF signal is chopped from the RF signal;
   wherein the drive apparatus is configured to reduce the duty ratio of the RF signal during at least one predefinable period of the RF signal in order to adjust levels of dimming which correspond to dimming values which are between a first and a second dimming value which differ from one another by at least one period of the RF signal; wherein the PWM signal remains unchanged between the first dimming value and the second dimming value.

13. A circuit arrangement for operating and dimming at least one light emitting diode, the circuit arrangement comprising:
   an input having a first and a second input connection for coupling to a DC supply voltage;
   a converter having at least one converter switch, wherein the converter is coupled to the input on the input side; wherein the converter is selected from the group consisting of a flyback converter, a step-down converter, and combinations thereof;
   a drive apparatus comprising an interface for coupling to a dimming apparatus for supplying a dimming value, wherein the dimming value is correlated with a level of dimming, wherein the drive apparatus is also configured to provide an RF signal with a predefinable duty ratio at the output of said drive apparatus; and
   an output having a first and a second output connection for coupling to the at least one light emitting diode, wherein the output is coupled to the output of the converter;
   wherein the drive apparatus is configured to modify, at least from a first predefinable dimming threshold value in the case of an increasing level of dimming, the RF signal by superposition of a PWM signal such that, in correlation with the supplied dimming value, a predefinable number of periods of the RF signal is chopped from the RF signal;
   wherein the drive apparatus is configured to reduce the duty ratio of the RF signal during at least one predefinable period of the RF signal in order to adjust levels of dimming which correspond to dimming values which are between a first and a second dimming value which differ from one another by at least one period of the RF signal; wherein the PWM signal remains unchanged between the first dimming value and the second dimming value.

\* \* \* \* \*